United States Patent [19]

Lymburner et al.

[11] Patent Number: 5,011,903
[45] Date of Patent: Apr. 30, 1991

[54] ENCAPSULATING AND PATCHING ELASTOMER FOR CONCRETE REPAIRS AND METHOD OF MAKING THE SAME

[75] Inventors: Frank M. Lymburner, Romeo; Charles M. Peterson, Franklin, both of Mich.

[73] Assignee: Peterson Elastomers, Inc., Pontiac, Mich.

[21] Appl. No.: 145,635

[22] Filed: Jan. 7, 1988

Related U.S. Application Data

[63] Continuation of Ser. No. 792,574, Oct. 29, 1985, abandoned.

[51] Int. Cl.$^5$ ............... C08G 18/48; C08G 18/34; C08G 18/32
[52] U.S. Cl. ..................... 528/76; 528/77; 528/80; 524/871; 524/872; 524/873; 524/874
[58] Field of Search ............ 524/726, 871, 872, 873, 524/874, 875, 590; 528/64, 79, 76, 77, 80; 428/425.5

[56] References Cited

U.S. PATENT DOCUMENTS

| 3,272,098 | 9/1966 | Buchholtz et al. | 428/425.5 |
|---|---|---|---|
| 3,723,163 | 3/1973 | Schumacher | 428/425.5 |
| 3,874,904 | 4/1975 | Orsini et al. | 524/590 |
| 3,920,617 | 11/1975 | Hirosawa et al. | 528/64 |
| 4,031,049 | 6/1977 | Hirosawa et al. | 528/64 |
| 4,108,954 | 8/1978 | Hilterbaus et al. | 528/62 |
| 4,164,251 | 8/1979 | Chung | 528/64 |
| 4,246,392 | 1/1981 | Koike et al. | 528/64 |
| 4,327,204 | 4/1982 | Oyaizu et al. | 528/64 |
| 4,345,058 | 8/1982 | Dettling | 528/48 |
| 4,365,051 | 12/1982 | Chung et al. | 528/64 |
| 4,551,498 | 11/1985 | Yeater et al. | 528/64 |

Primary Examiner—Lewis T. Jacobs
Attorney, Agent, or Firm—Reising, Ethington, Barnard, Perry & Milton

[57] ABSTRACT

An encapsulating and patching elastomer for concrete repairs including a two component urethane system including a polyol reacted with a diisocyanate or a mixture of diisocyanates and a hindered amine, and an aggregate filler. The elastomer polyester filler has a hardness of over 50 on the Shore A scale. The subject invention further provides a method of making an encapsulating and patching elastomer for concrete repairs, the method including the steps of dissolving the two component urethane system with the hindered amine. The mixture is applied as a film or patch to a concrete surface. The mixture is cured at ambient temperature for 48 to 72 hours to an elastomer having a hardness of over 50 on the Shore A scale.

1 Claim, No Drawings

ENCAPSULATING AND PATCHING ELASTOMER FOR CONCRETE REPAIRS AND METHOD OF MAKING THE SAME

This application is a continuation of application Ser. No. 792,574, filed Oct. 29, 1985, now abandoned.

TECHNICAL FIELD

The subject invention relates to elastomer coatings or films for the repair of holes in concrete surfaces. The subject invention is particularly well suited for repair of bridge decks and parking structures.

BACKGROUND ART

The extensive use of deicing salts has resulted in penetration of these salts into concrete, with resulting corrosion of steel re-enforcing and even prestressed tendons. The corrosion leads to expansion of the steel re-enforcing with resultant spalling of the concrete above the steel, causing pot holes in the surfaces of bridge decks and parking structures.

The customary way to repair bridge decks has been to repour additional new concrete topping over the deck. This method is not only expensive but in parking structures, there are many times no tolerance for added weight and decreased head room. Pot holes may be repaired with high quality concrete, but it is generally considered that the exposed steel should have a minimum of 1 inch to 1½ inches of concrete over the steel. If the patch is left exposed, the concrete over the steel should be a minimum of 2 inches thick. Hence, a problem exists when exposed steel re-enforcing is only a small distance below the concrete surface.

In the past, sand filled polymers such as epoxies, methyl methacrylates and polyesters have been used for this purpose. Fiber re-enforced concrete has also been used. In almost all cases, the stress is caused by traffic impact, thermal chances, and other stresses have resulted in subsequent cracking of these materials under usage.

Specifically, there are three preferred prior art methods for concrete patching. One method includes applying new concrete, this method being utilized mostly for deep patches of 1 inch or more. A second method utilized is a mixture of polymer concrete wherein aggregates are mixed with epoxies, polyesters and methyl methacrylates. A third method utilizes inorganic quick set cements of the phosphate and magnesium type which are fast setting and preferably used on bridge decks. The problem with these methods are that the applied patch is rigid when cured and has limited flexibility. Additionally, the thermo-expansion coefficient of the patch in the last two methods is different than that of the concrete. In all three of the prior art methods, the curing of the patch may build up a sizeable exotherm and expand during cure. Upon cooling of the patch, undesirable thermal stresses are created.

STATEMENT OF THE INVENTION

According to the present invention, there is provided an encapsulating and patching elastomer for concrete repairs. The elastomer includes a two component urethane system including a polyol reacted with a diisocyanate or a mixture of diisocyanates and a hindered amine. The resulting elastomer has a hardness of over 50 on the Shore A scale.

The instant invention further provides a method of making the encapsulating and patching elastomer including the steps of dissolving the two component urethane system. The mixture is applied as a film or patch to a concrete surface and cured at ambient temperature for 48 to 72 hours to an elastomer having a hardness of over 50 on the Shore A scale.

The subject invention provides a patch having much higher elongation, resilience, and tear-strength values than prior art patches. In addition, the subject invention has a much lower exotherm during cure, with much less residual shrinkage stress on the substrate after cure than compounds such as epoxies and methacrylates.

DETAILED DESCRIPTION OF THE INVENTION

The subject invention provides an encapsulating and patching elastomer for concrete repairs including a two component urethane system including a polyol reacted with a diisocyanate or a mixture of diisocyanates and a hindered amine. The elastomer has a hardness of over 50 on the Shore A scale.

More specifically, the polyol is selected from the group including propylene oxide adducts of diols and triols, caprolactone-based multifunctional polyols, and polytetramethylene ether glycol. Propylene oxide adducts of diol starters may be purchased from Union Carbide as NIAX® polyols PPG-425, PPG-725, PPG-1025, PPG-2025, PPG-3025, and PPG-4025. Propylene oxide adducts of triol starters may be purchased from Union Carbide as NIAX® polyols LG-56, LG-168, LG-650, and the LHT series of NIAX® polyols. These polyols have molecular weights in the range of 260 to 6300. Caprolactone-based multifunctional polyols may be purchased from Union Carbide under the trade name TONE™ polyols The TONE™ polyols have an average molecular weight range of 300 to 3000 and may be purchased as di- and tri-functional polyols. Polytetramethylene ether glycols may be acquired from DuPont in three molecular weight grades under the trade name of Teracol™. Teracol™ may be obtained at molecular weights from 650 to 2900. Teracol™ is a blend of linear diols in which the hydroxol groups are separated by repeating tetramethylene ether groups.

The hindered amine may be obtained from American Cyanamid Company as Cyanacure™. Cyanacure™ is 1,2-bis(2aminophenylthio)ethane in a free flowing flake form. The hindered amine may also be obtained from the commercial chemicals department of Polaroid Corporation as polytetramethylene oxide-di-p-aminobenzoate. The Polaroid compound is an oligomeric diamine having an average molecular weight of 1238. The compound is liquid under ambient conditions. Other hindered amines may be used.

The diisocyanate may be selected from the group including aliphatic and aromatic diisocyanates. Examples of aliphatic diisocyanates are dicyclohexylmethane-4,4'-diisocyanate, also known as methylene bis(4-cyclohexylisocyanate) sold under the trade name Desmodur W™ by Mobay Chemical Corporation. Isopherone diisocyanate may also be utilized. Examples of aromatic diisocyanates are 2,4 toluene diisocyanate and 2,6 toluene diisocyanate which may be obtained from BASF Wyandotte Corporation. Another example is diphenylmethane diisocyanate which may be obtained under the trade name Mondur® M from the polyurethane division of Mobay Chemical Corporation.

The ratio of isocyanate to hydroxyl groups in the prepolymer can vary from 1.5 to 1.0 to 3.0 to 1.0.

The elastomer may include an aggregate filler. The aggregate filler is preferably sand, but may take other forms of gravel or pellet. The aggregate filler is preferably in the 6 mesh to 40 mesh size range for shallow patches of ¼ to ½ inch and is ¼ inch to ¾ inch diameter in size for thicker patches of 2 to 3 inches in depth. Aggregate filler may not be necessary for very shallow cracks or scaling in concrete. In such shallow applications, the elastomer alone provides a sufficient patch.

The utilization of a urethane system provides flexibility in processing heretofore not obtainable from prior art systems. For example, prior art patch systems provide rigid inflexible patches. The subject invention may be modified by the molecular weight of the polyol utilized to provide a harder or softer patch. The lower molecular weight polyols provide a more rigid patch whereas the higher molecular weight polyols will provide a more flexible patch.

The subject invention further provides a method of making the encapsulating and patching elastomer for concrete repairs. Generally, the method includes the steps of dissolving the two component urethane system by either first melting the hindered amine and dissolving the urethane system therein or dissolving components in a solvent and mixing an aggregate filler with the solution. The mixture is applied as a film or patch to the concrete surface. The mixture is cured at ambient temperature for 48 to 72 hours to an elastomer having a hardness of over 50 on the Shore A scale. A cure accelerator may be added to the solution to cure the elastomer in 8 to 24 hours. Dibasic acids, such as adipic acid or azelic acid may be used as the accelerating agent. After 8 to 24 hours, a nonaccelerated patch cure provides a patch that can handle automobile traffic. Final cure without acceleration takes from 48 to 72 hours.

The preferred solvent is N,N-dimethylformaminde although other suitable solvents may be used.

The subject method may include the step of applying a primer to the concrete surface prior to applying the mixture thereto. The primer may be selected from the group including common two component urethane primers, one component urethane primers and dilute solutions of silanes. Such primers provide long term adhesion to the substrate.

Specifically, spalls or pot holes to be treated are cut out to remove all unsound concrete. If re-enforcing steel only is present, the concrete may be cut out below the steel if required. If exposed post-tensioning tendons of the superstructure are involved, care must be taken not to remove concrete below the tendons as this will result in a decrease in tension on the tendons. Exposed steel should be cleaned preferably by sandblasting and primed with a corrosion resistant primer.

After thorough cleaning, the joint is then primed with the compatible primer and the two component encapsulating compound is thoroughly mixed and applied in the joint to form a flush surface with the concrete. A urethane top coat may be rolled on and aggregate applied and back rolled to give a nonslip surface for traffic after cure.

Normally, many urethane compounds require absolutely dry extenders to avoid generation of carbon dioxide gas and resultant gasing. When using the subject invention, there is no requirement that the fillers be absolutely dry as required when the cure is based on NCO-hydroxyl reactions.

It has been found that the instant invention may also be used as a leveling course for low areas in concrete referred to as "bird baths".

The impact resistance of the subject elastomer is outstanding compared to concrete or other polymers such as epoxies, polyesters, and methacrylates. The subject invention develops a continuous bond when applied to most substrates and is impervious to water penetration. It maintains consistent properties and has excellent elastomeric adhesion properties which retain bond and bridge cracks over a wide range of temperatures. Importantly, the subject elastomer is highly reactive and will cure at lower temperatures than prior art epoxies, polymer concrete combinations and quick setting cements. Accordingly, minimum amount of thermal stress is present after cure due to much lower exotherms during cure, greater elongation, and lower modulus after cure.

EXAMPLES

In the following examples, a urethane system including toluene diisocyanate (TDI and different polyols and a hindered amine (Cyanacure TM) were dissolved in a specified amount of solvent. The elastomer was cured for 72 hours on a plate of glass. The cured elastomer was removed and physical properties were quantitated. All weight are expressed in pounds.

EXAMPLE

| Polyol | TDI | Hindered Amine | DMF | NCO/NH₂ | % Elongation | Tensile Strength PSI | Elongation Set (%) | Split Tear (PLI) | Shore A Hardness |
|---|---|---|---|---|---|---|---|---|---|
| Teracol 1000 | | | | | | | | | |
| 74.2 | 25.8 | 17.4 | 8.7 | 0.85 | 320 | 991.1 | 12 | 202.8 | 86 |
| | | | | 0.95 | 100 | 743.8 | 0 | 83.3 | 84 |
| | | | | 0.75 | 450 | 1481.8 | 14 | 253.3 | 87 |
| | | | | 0.65 | 460 | 2209.8 | 8 | 165.5 | 89 |
| PCP-0240 | | | | | | | | | |
| 85.2 | 14.8 | 10.0 | 5.0 | 0.85 | 530 | 1897.1 | 10 | 177.8 | 81 |
| | | | | 0.95 | 510 | 1963.6 | 8 | 197.5 | 84 |
| | | | | 0.75 | 530 | 2022.7 | 5 | 219.2 | 85 |
| PPG-2025 | | | | | | | | | |
| 85.2 | 14.8 | 10.0 | 5.0 | 0.85 | 210 | 437.9 | 4 | 82.4 | 71 |
| | | | | 0.95 | 170 | 456.5 | 6 | 98.2 | 77 |
| | | | | 0.75 | 230 | 333.3 | 2 | 81.2 | 72 |
| | | | | 0.65 | 250 | 306.1 | 3 | 80.0 | 69 |

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. An encapsulating and patching elastomer for concrete repairs, and protection, said elastomer comprising: a two component urethane system including a polyol reacted with a diisocyanate or a mixture of diisocyanates and a hindered amine, said elastomer having a hardness of over 50 on the Share A scale said polyol being selected from the group including proprylene oxide adducts of diols and triols, caprolactone-based multifunctional polyols, and polytetramethylene ether glycol, said hindered amine being an oligomeric diamine, said oligomeric diamine being polytetramethylene oxide-di-p-aminobenzoate.

* * * * *